Figure 1:
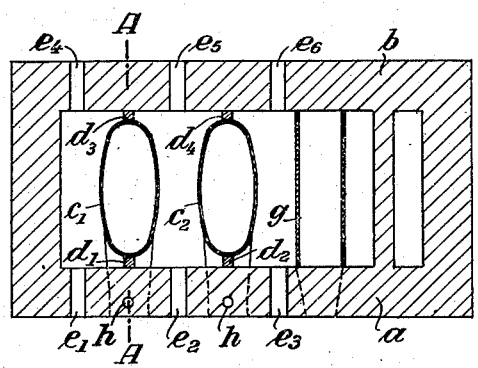

Oct. 7, 1941.　　　　O. SALADIN　　　　2,258,367
APPARATUS FOR THE PRODUCTION OF CARBON DISULPHIDE
Filed July 6, 1939

Inventor.
Otto Saladin,
By Bryant & Locoup,
Attorney.

Patented Oct. 7, 1941

2,258,367

UNITED STATES PATENT OFFICE 2,258,367

APPARATUS FOR THE PRODUCTION OF CARBON DISULPHIDE

Otto Saladin, Schweizerhalle, Switzerland, assignor to Saurefabrik Schweizerhall, Schweizerhalle, Switzerland Application July 6, 1939, Serial No. 283,035 In Germany July 21, 1938

3 Claims. (Cl. 23—277)

This invention relates to the economic production of carbon disulphide from sulphur and carbon in a furnace with undivided retorts. By the term "undivided retorts" as used in connection with this invention are understood retorts without separate compartment for the vaporization of the sulphur.

The reaction between the charcoal and sulphur takes place in practically sufficient intensity only at temperatures exceeding 800° C. Consequently, both the charcoal and also the sulphur must first attain these temperatures before an appreciable reaction occurs. The question thus arises in particular, as to what method of heating it to be used for heating the reaction substances to that temperature.

The former method was based on the idea of maintaining the charcoal column in the retort at the reaction temperature on its entire height, on which account it was endeavoured to uniformly heat the retort on its entire height. The heating gases were mostly introduced into the heating space from below in the expectation, that by the natural buoyancy of the gases the heat quickly distributes itself from the bottom to the top. Or the retorts were indirectly heated by the hottest gases first from below and then directly by the colder gases from above.

However, this heating principle hitherto followed in the carbon disulphide industry does not by any means take into consideration a rational heating of the sulphur and the thermo-technical conditions for the formation of carbon disulphide. This is proved by the following reflection, which led to new teachings on which the present invention is based.

Sulphur heated moderately above the melting point always enters the retort. This sulphur with a temperature of 120 to 150° C. must first be brought to its boiling point at 445° C., that is must be vaporized and the sulphur vapour must then be heated to a high temperature of about 800° C. Additional heat of high temperature, that is exceeding 800° C., must be fed into the reaction zone for preserving the reaction, for making up the natural heat losses of the retort and particularly to bring quickly to the reaction temperature the charcoal entering the reaction zone from above preheated to less than 800° C. Consequently, there are different phases and conditions between the sulphur admission and the formation of the carbon disulphide, and if the requirement of heat for the different stages is followed it will be found that the highest temperature is continually necessary for the reaction zone and the lowest temperature for the sulphur vaporization in the sulphur sump, and that between these there is a great drop in temperature over the phase of the sulphur vapour.

The invention is based on the knowledge that for logically and economically carrying out the production of the carbon disulphide it is wrong, only to make provision for a uniform heating of the charcoal within the retort and at the same time leave out consideration the necessary rise in temperature of the sulphur in that, in the known manner the hottest heating gases are fed to the coldest sulphur and the reaction zone which requires the highest temperature is heated by heating gases which have already cooled.

It has been found that the heating of the retorts must be accurately adapted to the temperature requirement of the reaction and to the drop in temperature of the sulphur in that the hottest gases should heat the reaction zone of the retort for preserving the reaction temperature, whereas the coldest gases should heat the liquid sulphur for producing the sulphur vapours, and that there should be an intermediate zone, in which the temperature rise of the sulphur vapours is effected by a corresponding temperature drop of the heating gases. Therefore, contrary to the former processes, the heating gases must be conducted so that a rise or drop in temperature extending over the height of the retort is produced, namely a temperature rise within the retort from the liquid sulphur over a sulphur vapour column becoming gradually hotter to the reaction zone, and a temperature drop outside the vertical retort by conducting the heating gases in counter flow to the sulphur.

This object is attained according to the invention in that, using an undivided vertical retort, on the bottom of which is the sulphur sump, the heating gases are allowed to enter the upper portion of the heating spaces, distributed as uniformly as possible over the entire upper periphery of the retort, and guiding them in undisturbed currents uniformly distributed over the periphery of the retort in downward direction along the retort walls and finally directly under the bottom of the retort. In this manner the hottest heating gases are at the reaction zone in the highest portion of the retort requiring the highest temperature, flow in counter flow to the sulphur vapours which develop from the sulphur sump and rise and become heated on the hot walls, the heating gases being thereby cooled and leave the heating spaces of the retort at their lowest temperatures under the bottom of the retort requiring the lowest temperatures. This heat exchange in counter flow of heat imparting heating gases outside the retort and of heat absorbing sulphur within the retort, preserving the hottest (reaction) zone in the upper part, the coldest (sulphur vaporizing) zone in the bottom of the retort and an intermediate zone with corresponding drop in temperature, produces according to the invention the best reaction conditions and allows at the same time the best utilization of the heat of the heating gases.

To obtain a conduction of the gases and a temperature distribution corresponding to the process according to the invention in a positive and simple manner, the carbon disulphide furnace is, according to the invention, constructed as follows.

Several undivided retorts are accommodated in a furnace space transversely to the longitudinal axis thereof in the arrangement of the cleaning holes. These retorts may be of circular, elliptical, oval or rectangular cross section; they are preferably of elongated shape. Between the front or rear wall of the retort on the one hand and the front or rear wall of the furnace on the other hand a vertical wall is arranged extending from the roof to the bottom of the furnace or to the cleaning hole of the retort. The retort walls and furnace walls may also be brought into direct contact. The front wall in the sense of the invention is the wall in which the cleaning holes of the retort are situated.

By fitting a plurality of retorts transversely to the longitudinal axis and by shutting off the individual heating spaces, a chamber furnace is obtained, which has both separate reaction chambers for carrying out the carbon disulphide reaction and also between these separate heating chambers for the heating gases. The retort itself must hang in the furnace or be only supported on the bottom of the retort in such a manner that at least the greater portion of the retort bottom is free and sufficient space remains between the bottom of the furnace and the bottom of the retorts for the passage of the gases. Consequently, between the front and rear walls of the furnace on the one hand and the side walls of the individual retorts on the other hand or between the side walls of the retort and the side walls of the furnace there are formed vertical heating shafts in the form of heating chambers, which are closed at the top by the roof of the furnace and at the bottom communicate with a common heating space below the bottoms of the retorts. The heating gases are introduced into these heating shafts under the roof of the furnace, from the two ends, from the rear wall and from the front wall. The gases must therefore move downwards along the retort walls in streams distributed uniformly over the cross-sectional area and brush under the bottom of the retorts, whence they are drawn off.

The measure according to the invention of maintaining a temperature drop in vertical direction, that is over the height of the retort, is combined with the effect of avoiding as far as possible any drop in temperature in horizontal direction. This is attained firstly in that the heating gases, as above mentioned, are admitted in the head of the heating shaft at two opposite front and rear walls, the admission apertures being arranged in vertical direction preferably mutually displaced slightly, and also in that by suitably designing the shape of the retorts, especially of the retort casing, it is possible for the heating gases to brush the same uniformly. From this requirement follows the construction of the retort with as far as possible straight side walls. The most ideal shape of a corresponding cross-section would be that of a rectangle of relatively narrow width, whose long sides extend from the front wall to the rear wall of the furnace. As, however, retorts of cast metal are used in practice and these are in some instances lined, the suitable shape for the cross-section of the retort is found to be that of a long chamber-like oval, adapted to the shape of the furnace chamber. In this manner the furnace space is utilized to best advantage and at the same time the largest wall surface in relation to the retort capacity and consequently the greatest heating surface for the sulphur vapour are attained.

In applying the fitting principle followed in reaction retorts a retort of any shape for the preliminarily glowing of the fresh charcoal can be fitted in the furnace in the same way as a carbon disulphide retort, that is with free bottom and connected with the front and rear walls of the furnace, or yet more simply, a chamber-like retort can be formed between two vertical transverse walls extending from the front side to the rear side of the furnace and between the front and rear side of the furnace proper. As the heating gases coming from under the carbon disulphide retorts are still sufficiently hot to degasify the fresh charcoal in a sufficiently heat permeable retort, the charcoal retort is preferably placed at that end of the furnace to which the heating gases flow. While its side facing the neighbouring carbon disulphide retort is heated by the heating gases descending there, the bottom and the side of the charcoal retort facing the end of the furnace are heated by the collected waste gases from below and then from the bottom towards the top. Therefore the whole furnace is given the character of a real chamber furnace by the shape of the carbon disulphide and charcoal retorts described and by the manner of mounting.

Figure 2:
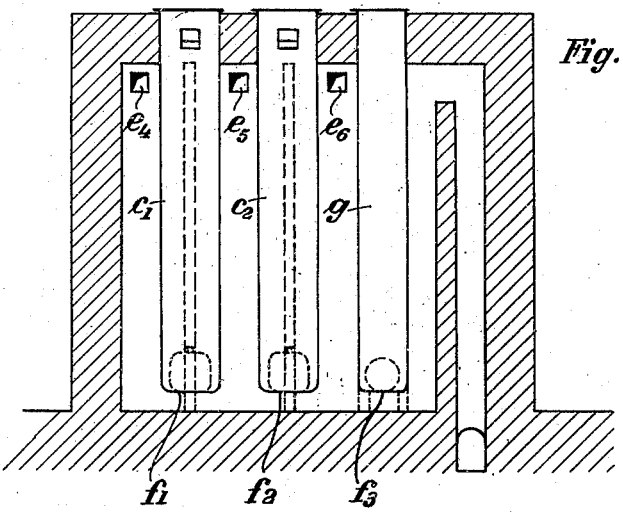
Figure 3:
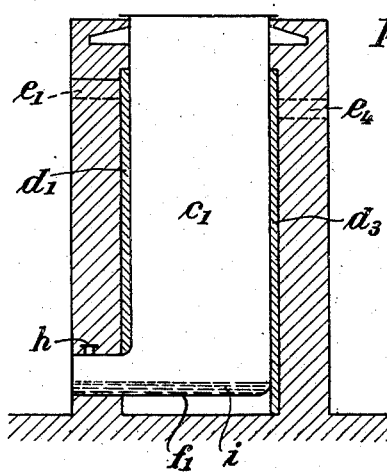

In the accompanying drawing:

Fig. 1 shows in longitudinal section a furnace particularly suitable for carrying out the invention, Fig. 2 is a vertical longitudinal section of Fig. 1, Fig. 3 is a vertical cross-section through the first retort, taken on line A—A' of Fig. 1.

$a$ is the front wall, $b$ the rear wall of the furnace, $c^1$ and $c^2$ are two carbon disulphide retorts which are here shown as of elongated oval shape. The retorts $c^1$ and $c^2$ are connected to the furnace walls $a$ and $b$ respectively by means of vertical walls $d^1$ and $d^2$ and $d^3$ and $d^4$ respectively. The heating gases enter the heating spaces through the apertures $e^1$—$e^6$ in the front and rear sides of the furnace under the furnace roof, descend in these shafts, pass under the retort bottoms $f^1$, $f^2$ and $f^3$ upwards along the not directly heated side wall of the charcoal retort $g$ and finally escape from the furnace. In every individual heating shaft the opposite apertures $e^1$—$e^3$ and $e^4$—$e^6$ of the guiding of the heating gas are preferably mutually displaced slightly in vertical direction. Before or after leaving the furnace the heating gases may be conducted through a heat exchanging system, which for example serves for preheating the combustion air. The sulphur is fed into the retort through the hole $h$, $i$ designates the sump of the molten sulphur. As is apparent the retort heating is practically limited to the heating activity of the gases entering the several heating chambers through openings $e'$—$e^6$, thus distinguishing from the usual practice of the use of a heat supply in the form of a heating chamber substantially coextensive with the active furnace length and generally of greater vertical height and forming the equivalent of a storage chamber from which the heating gases enter the individual heating chambers. Therefore, in the present invention, the temperatures in the individual heating chambers are not affected by heat exchange from a storage chamber and can therefore provide for a practically controlled temperature regimen within the retort content through the heat exchange characteristic that is present between the heating gases of the individual heating chambers and the retort content with the regimen reaching from the lower temperatures in the sump zone to the desired high temperatures of the reaction zone, a regimen made possible by the fact that the temperature of the heating chambers is higher than the temperature of the retort content on any horizontal section of the furnace, ensuring that proper heat exchange conditions are present throughout, although the temperature loss as the gas flows downward in a heating chamber due to such heat exchange, lowers the temperature of the bottom zone of the retorts.

At the same time there is no excessive difference in temperature on opposite sides of the retort wall such as would affect the operation. This is due to the fact that the temperatures of the retort content on successive cross sections of the retort in an upward direction are increasing progressively through the heat exchange action, reaching the proper temperatures within the reaction zone and ensuring a maximum efficiency of operation and result. This action will become manifest in practice as soon as the regimen has become established, and will remain constant as long as the regimen remains established.

The success of the process according to the invention and of the apparatus provided therefore in the shape of a chamber furnace of the type according to the invention is expressed in an unexpected manner in that precisely by using simple, undivided and therefore cheap retorts a high production of carbon sulphide is attained, that by the rational conducting of the gas and by the rational manner of operation the consumption of heating material is relatively small, and that a furnace constructed according to the invention is very simple and cheap.

I claim:

1. A furnace installation for the production of carbon disulphide from charcoal and sulphur, comprising a furnace space, a plurality of vertically upright retorts of oval cross-section each adapted to be charged with charcoal at its upper end and having a sulphur sump and a cleaning hole at its lower end, vertical walls extending from the roof to the bottom of the furnace and connecting the front and rear walls of the furnace with the retorts to thereby form heating chambers for the retorts individual at the sides of a retort with adjacent chambers in open communication at the bottom of the retort beneath and adjacent the wall of the sump, said front and rear walls of the furnace each having a gas inlet for each of said heating chambers with the respective inlets positioned adjacent the top of the heating chamber to thereby provide a flow-path for the heating gases leading from the top of the chamber to the exit beneath the sump wall enroute to the point of gas discharge from the furnace, said inlets forming substantially the complete heating source for the retorts, whereby heat exchange activities between the heating chambers and the retort content will be maintained throughout the length of the retort with such activities establishing a substantially increasing temperature progression within the retort from the sump to and into the reaction zone of the retort with the temperature value substantially uniform on a cross-section of the retort.

2. An installation as in claim 1, characterized in that the gas inlet of a heating chamber are within the top zone of the chamber with the inlet of one furnace wall displaced vertically relative to the similar inlet of the opposite furnace wall.

3. An installation as in claim 1, characterized in that the furnace includes an additional retort formation for preliminary glowing of the charcoal with the latter retort having the wall of one of its sides open to one of such heating chambers, said additional retort having its bottom wall arranged to form the gas exit from such heating chamber and a passageway for the exiting gases of the several chambers, said furnace including a baffle wall adjacent to and spaced from the opposite side of the additional retort to thereby cause the exiting gases to heat such retort side while en route to the discharge point.

OTTO SALADIN.